United States Patent
Conner (10) Patent No.: US 6,597,681 B1
(45) Date of Patent: Jul. 22, 2003

(54) TIME-BASED MAPPING OF CONTROL CHANNEL BURSTS IN A WIRELESS COMMUNICATION NETWORK

(75) Inventor: Keith F. Conner, Boonton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/447,790

(22) Filed: Nov. 23, 1999

(51) Int. Cl.[7] .............................................. H04B 7/212
(52) U.S. Cl. ..................... 370/347; 370/337; 370/458; 455/450; 455/452
(58) Field of Search ................................ 370/328, 329, 370/330, 331, 337, 342, 347, 348, 443, 458, 459, 478; 455/62, 63, 67.3, 296, 423, 424, 436, 450, 452

(56) References Cited

U.S. PATENT DOCUMENTS 5,933,418 A * 8/1999 Massingill et al. ......... 370/321
5,940,380 A * 8/1999 Poon et al. .................. 370/330
6,011,786 A * 1/2000 Dent ............................ 370/330
6,256,486 B1 * 7/2001 Barany et al. ............... 455/296

* cited by examiner

Primary Examiner—Thanh Cong Le
Assistant Examiner—James D Ewart (57) ABSTRACT

An apparatus and method for controlling the timing of control bursts in a wireless communications network maps the timing of control bursts on a multiframe by multiframe basis. In one implementation, a method of controlling base station transmissions in a wireless network in accordance with a multi-frame timing structure is provided. The method is defined as a succession of y frames, each frame including a succession of x time-slots, and includes allocating a frame/time-slot number pair to set the timing of a first-type control burst for a first multi-frame, and changing at least one of the (i) frame number and (ii) frame number and time-slot number of the frame/time-slot number pair for a second multi-frame so that the timing of the first-type control burst is different during the second multi-frame relative to the first multi-frame.

28 Claims, 5 Drawing Sheets

| FRAME \ TIME SLOT | 0 | 1 | 2 | 3 | 4 | 5 | 6 | 7 |
|---|---|---|---|---|---|---|---|---|
| $B_0$ 0-3 | | CPBCCH | | X | | X | | |
| $B_1$ 4-7 | | | | | | | | |
| $B_2$ 8-11 | | | | | | | | |
| 12 | PTCCH → | | | | | | | |
| $B_3$ 13-16 | | CPCCCH | | X | | X | | |
| $B_4$ 17-20 | | | | | | | | |
| $B_5$ 21-24 | | | | | | | | |
| 25 | IDLE | PSCH OR PFCCH | IDLE → | | | | | |
| $B_6$ 26-29 | | CPCCCH | | X | | X | | |
| $B_7$ 30-33 | | | | | | | | |
| $B_8$ 34-37 | | | | | | | | |
| 38 | PTCCH → | | | | | | | |
| $B_9$ 39-42 | | CPCCCH | | X | | X | | |
| $B_{10}$ 43-46 | | | | | | | | |
| $B_{11}$ 47-50 | | | | | | | | |
| 51 | IDLE | PSCH OR PFCCH | IDLE → | | | | | |

FIG. 3B

| FRAME \ TIME SLOT | 0 | 1 | 2 | 3 | 4 | 5 | 6 | 7 |
|---|---|---|---|---|---|---|---|---|
| B₀ { 0-3 | | ✕ | | CPBCCH | | ✕ | | |
| B₁ { 4-7 | | | | | | | | |
| B₂ { 8-11 | | | | | | | | |
| 12 | PTCCH →                |   |   |   |   |   |   |   |
| B₃ { 13-16 | | ✕ | | CPCCCH | | ✕ | | |
| B₄ { 17-20 | | | | | | | | |
| B₅ { 21-24 | | | | | | | | |
| 25 | IDLE → | | | PSCH OR PFCCH | IDLE → | | | |
| B₆ { 26-29 | | ✕ | | CPCCCH | | ✕ | | |
| B₇ { 30-33 | | | | | | | | |
| B₈ { 34-37 | | | | | | | | |
| 38 | PTCCH → | | | | | | | |
| B₉ { 39-42 | | ✕ | | CPCCCH | | ✕ | | |
| B₁₀ { 43-46 | | | | | | | | |
| B₁₁ { 47-50 | | | | | | | | |
| 51 | IDLE → | | | PSCH OR PFCCH | IDLE → | | | |

FIG. 3C

| TIME SLOT / FRAME | 0 | 1 | 2 | 3 | 4 | 5 | 6 | 7 |
|---|---|---|---|---|---|---|---|---|
| $B_0$ { 0-3 | | X | | X | | CPBCCH | | |
| $B_1$ { 4-7 | | | | | | | | |
| $B_2$ { 8-11 | | | | | | | | |
| 12 | PTCCH → | | | | | | | |
| $B_3$ { 13-16 | | X | | X | | CPCCCH | | |
| $B_4$ { 17-20 | | | | | | | | |
| $B_5$ { 21-24 | | | | | | PSCH OR PFCCH | | |
| 25 | IDLE → | | | | | | → | |
| $B_6$ { 26-29 | | X | | X | | CPCCCH | | |
| $B_7$ { 30-33 | | | | | | | | |
| $B_8$ { 34-37 | | | | | | | | |
| 38 | PTCCH → | | | | | | | |
| $B_9$ { 39-42 | | X | | X | | CPCCCH | | |
| $B_{10}$ { 43-46 | | | | | | | | |
| $B_{11}$ { 47-50 | | | | | | | | |
| 51 | IDLE → | | | | | | → | |

PSCH OR PFCCH

TIME-BASED MAPPING OF CONTROL CHANNEL BURSTS IN A WIRELESS COMMUNICATION NETWORK

BACKGROUND OF THE INVENTION

1. Field of the Invention

The present invention relates to the field of wireless communications.

2. Description of Related Art

The segment of the wireless communications community which supports TDMA (Time Division Multiple Access)-based networks embodied in the IS-136 standard, through the UWCC (Universal Wireless Communication Consortium), has undertaken an evolution of the IS-136 TDMA standard toward a 3G (third-generation) wireless network which supports high-speed packet data services such as Internet/intranet access and other multimedia applications. As a major step in this evolution, the UWCC has decided to adopt GSM (Global System for Mobile Communication) EDGE (Enhanced Data for Generic Packet Radio Service Evolution)-based TDMA technology to support high-speed packet data service, and ultimately facilitate global roaming of network subscribers. The EDGE-based technology for packet data service being adopted by the IS-136 TDMA community, called EDGE-COMPACT, nominally is characterized by three 200 kHz air-interface channels, ⅓ frequency reuse (i.e., each base transceiver station (BTS) for a three sector cell being allocated the same three frequency channels as other BTSs), time-division of each 200 kHz frequency channel into eight time slots, and a 52 multiframe (frames being numbered 0 . . . 51 ) control signaling structure similar to that used in standard GSM networks. A 52 multiframe structure is a sequence of 52 frames, where each frame consists of x consecutive time-slots of the air-interface channel (e.g., x=8).

By using three 200 kHz carriers and ⅓ frequency reuse, it is anticipated that EDGE-COMPACT can be deployed in approximately 600 kHz of spectrum. A key characteristic of EDGE-COMPACT which makes ⅓ frequency reuse feasible, and which is a significant departure from standard GSM implementations, is highly accurate time synchronization among all network BTSs down to the symbol level (i.e., within +/−3.69 $\mu$s), and "time-grouping" of sectors to reduce interference between packetized control data transmitted from proximate BTSs. More specifically, EDGE-COMPACT requires that each sector be designated to one of a plurality (e.g., three or four) of time-groups to protect control data "bursts," such that when a sector assigned to a first time-group transmits certain control data, sectors assigned to other time-groups are idle. A burst duration is one time-slot of one frame.

Like current implementations of GSM, a mobile station (MS) must first synchronize with a BTS to enable packet data communication in EDGE-COMPACT. To enable such synchronization, a BTS transmits PSCH (Packet version of Synchronization Channel) control bursts which the MS uses for timing acquisition. PSCH control bursts also contain the base station identifier code (BSIC) and other information needed by the MS to select/reselect a serving BTS. An MS must continually detect PSCH control bursts from a plurality of neighboring BTSs. PSCH control bursts may also be referred to as CSCH (COMPACT Synchronization CHannel) control bursts.

Each BTS also transmits PFCCH (Packet version of a Frequency Correction Channel) control bursts which an MS monitors for the purpose of accurately tuning to the central frequency of the corresponding air-interface to channel. PFCCH control bursts may also be referred to as CFCCH (COMPACT Frequency Correction CHannel) control bursts. An MS typically needs to tune the central frequency of an air-interface channel only when the MS is initially powered On. In accordance with EDGE-COMPACT, each BTS further transmits other types of control information, including CPBCCH (COMPACT Packet Broadcast Control Channel) bursts and CPCCCH (Compact Packet Common Control channel) bursts.

Recent proposals for implementing the EDGE-COMPACT concepts discussed above have assumed that PFCCH and PSCH bursts should occur on the same frame from multiframe to multiframe, and specifically that each BTS should transmit PFCCH bursts on frame 25 and PSCH bursts on frame 51 of the 52 multiframe (0 . . . 51) control signaling structure. While such static timing of control channel bursts is suitable for standard GSM, the time synchronization between BTSs which facilitates ⅓ frequency reuse in EDGE-COMPACT will result in infrequent PSCH burst decoding opportunities by an MS, specifically only during one frame of each multiframe. Therefore, because of the time needed to tune to a different frequency channel, each MS will typically only have an opportunity to decode the BSICs (contained in PSCH bursts) of BTS transmissions which occur on a single frequency channel during each multiframe, and, thus, will typically require at least three multiframes to "see" the PSCH bursts occurring on all three frequency channels of the six strongest non-serving BTSs which are required-for reselection. More frequent PSCH decoding opportunities for a MS could result in decreased BTS reselection times.

SUMMARY OF THE INVENTION

The present invention is an apparatus and method which controls the timing of control bursts in a wireless communications network by time-mapping control bursts on a multiframe by multiframe basis so that mobile stations will have increased opportunities to decode control information which is transmitted by network BTSs on different frequencies.

In one embodiment, the present invention is implemented in a wireless network which supports packet data service using three air-interface channels (e.g., each channel corresponding to 200 kHz of spectrum), ⅓ frequency reuse, time division of each air-interface channel into x time slots (e.g., x=8), a y multiframe control signaling structure (e.g., y=52), time synchronization among BTSs, and time-grouping of cell sectors. Each cell sector is grouped into one of z time groups (e.g., y=3 or 4) to protect control data transmissions, such that when a sector assigned to a first time-group transmits certain control data, sectors assigned to other time groups are idle. In contrast to standard GSM control signaling structures in which control data bursts occur on the same frame each multiframe, control channel bursts are time-mapped on a multiframe by multiframe basis to form a timing pattern which provides an MS with more opportunities to receive and decode the control bursts transmitted on different frequency channels.

In one specific implementation, each BTS transmits a PSCH burst during an assigned time-slot of either frame 25 or frame 51 of a 52 multiframe (0 . . . 51) control signaling structure, and transmits a PFCCH burst during an assigned time-slot in frame 51 when the PSCH burst is transmitted in frame 25 and in frame 25 when the PSCH burst is transmitted in frame 51. The BTS will re-map the frame locations of the PSCH and PFCCH bursts during a subsequent multiframe as a function of the frequency channel being utilized so that PSCH bursts occur during frames 25 and 51 respectively on at least one frequency channel. In this way, an MS will be able to detect PSCH bursts being transmitted on all three frequency channels within two multiframes. Thus, the MS can perform all control measurements needed for reselection in a reduced amount of time.

BRIEF DESCRIPTION OF THE DRAWINGS

Other aspects and advantages of the present invention will become apparent upon reading the following detailed description and upon reference to the drawings, in which.

DETAILED DESCRIPTION

The present invention is an apparatus and method which controls the timing of control bursts in a wireless communications network by time-based mapping control bursts on a multiframe by multiframe basis so that each MS has an increased number of opportunities to receive control data from a plurality of network BTSs transmitting on different frequency channels. An illustrative embodiment of the apparatus and method according to the present invention is described below.

Figure 1:
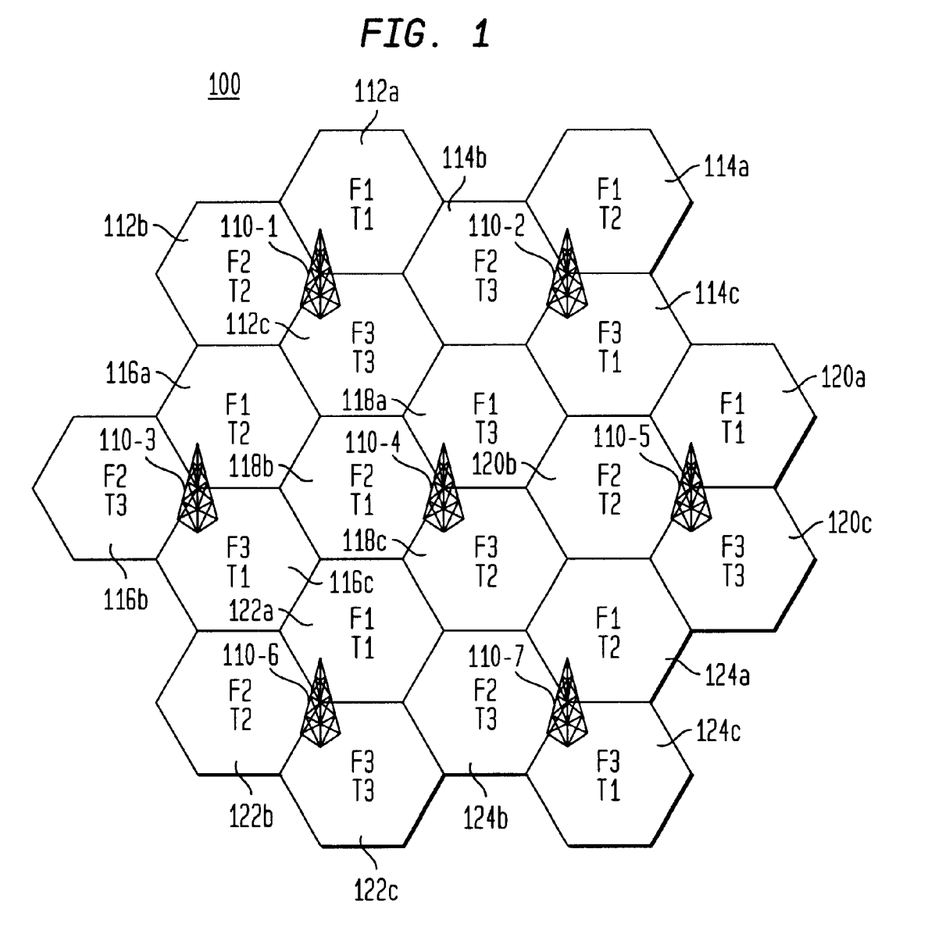
FIG. 1 illustrates a wireless communications network configuration suitable for implementing embodiments of the present invention.

Referring now to FIG. 1, there is shown an exemplary wireless communications network suitable for implementing embodiments of the present invention. As shown in FIG. 1, a network area 90 is divided into a plurality of three-sector cells, each provided with a BTS 110-1, . . . , 110-7 which serve MSs therein. A first BTS 110-1 serves sectors 112*a*, 112*b*, and 112*c*; a second BTS 110-2 serves sectors 114*a*, 114*b*, and 114*c*; a third BTS 110-3 serves sectors 116*a*, 116*b*, and 116*c*; a fourth BTS 110-4 serves sectors 118*a*, 118*b*, and 118*c*; a fifth BTS 110-5 serves sectors 120*a*, 120*b*, and 120*c*; a sixth BTS 110-6 serves sectors 122*a*, 122*b*, and 122*c*; and a seventh BTS 110-7 serves sectors 124*a*, 124*b*, and 124*c*. Each BTS 110-1, . . . , 110-7 is connected to a BTS controller (not shown) which manages the wireless network, and serves as an interface between network BTSs and between the wireless network and a separate network, such as a Public Switched Telephone Network. Each BTS 110-1, . . . , 110-7 is nominally assigned three frequency channels, e.g., three 200 kHz channels, so that each sector served by the BTS is characterized by a different frequency channel. In the exemplary configuration of FIG. 1, sectors 112*a*, 114*a*, 116*a*, 118*a*, 120*a*, 122*a*, and 124*a* are served by their respective BTS on frequency channel F1; sectors 112*b*, 114*b*, 116*b*, 118*b*, 120*b*, 122*b*, and 124*b* are served by their respective BTS on frequency channel F2; and sectors 112*c*, 114*c*, 116*c*, 118*c*, 120*c*, 122*c*, and 124*c* are served by their respective BTS on frequency channel F3. Therefore, the network configuration illustrated in FIG. 1 incorporates a ⅓ frequency reuse scheme.

A To enable ⅓ frequency reuse while ensuring the integrity of certain packet control data transmitted by each of the BTSs 110-1, . . . , 110-7, each BTS is time-synchronized and utilizes a y multiframe (e.g., y=52) control signaling structure. Furthermore, each sector is assigned to one of z time groups to protect packet control data transmissions, such that when a sector assigned to a first time-group transmits certain control data, sectors assigned to other time-groups can be forced idle. For the network configuration illustrated in FIG. 1, sectors 112*a*, 114*c*, 116*c*, 118*b*, 120*a*, 122*a*, and 124*c* are assigned to time group T1; sectors 112*b*, 114*a*, 116*a*, 118*c*, 120*b*, 122*b*, and 124*a* are assigned to time group T2; and sectors 112*c*, 114*b*, 116*b*, 118*a*, 120*c*, 122*c*, and 124*b* are assigned to time group T3. Although three time groups are used in a configuration of FIG. 1, it is possible to use more or less time groups. As will be described in more detail below, such time-grouping of sectors is used to control when the BTSs 110-1, . . . , 110-7 can transmit control bursts on each of the three frequency channels F1, F2, and F3. Accurate time synchronization among BTSs, e.g., down to the symbol level, allows such time-grouping to be realized for packet control data protection.

Figure 2:
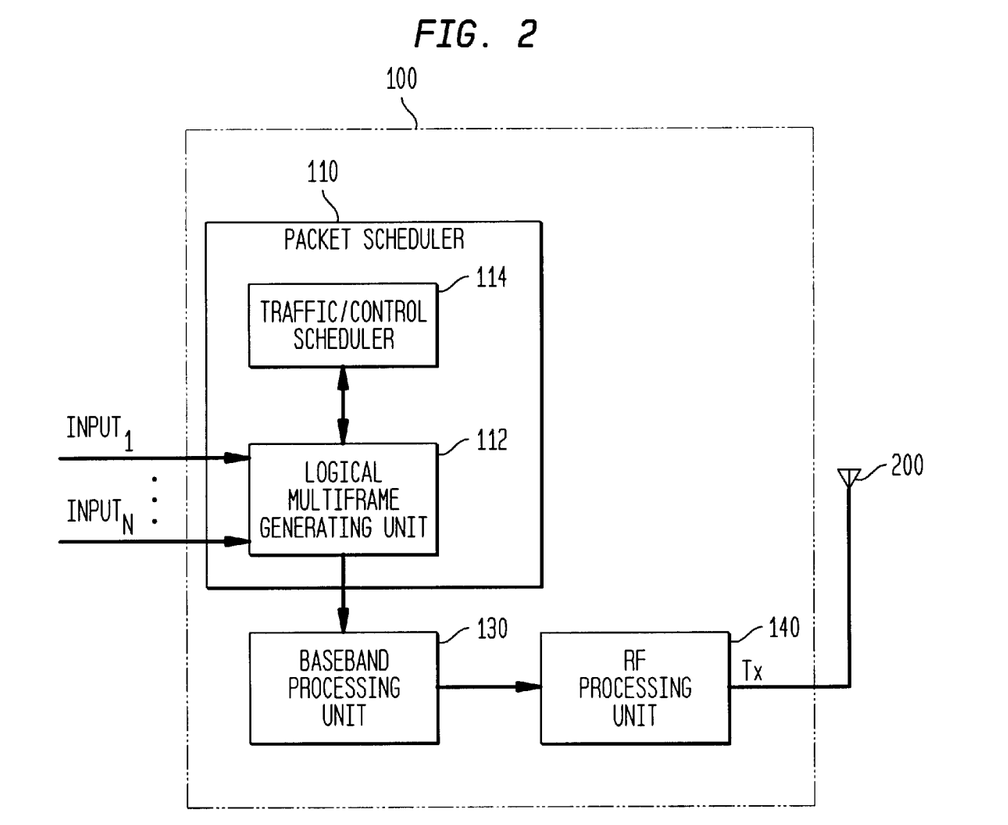
FIG. 2 is a general block diagram of an exemplary base station transmitter suitable for implementing time-based mapping of control bursts according to embodiments of the present invention.

Referring to FIG. 2, there is shown a general block diagram of a BTS transmitter 100 suitable for implementing the multiframe control scheme with time-mapped control bursts according to an embodiment of the present invention. As shown in FIG. 2, the BTS transmitter 100 includes a packet scheduler unit 110, a baseband processing unit 130, and a radio frequency (RF) processing unit 140. The packet scheduler 110 includes a logical multiframe generating unit 112 which receives a plurality of signals $input_1, \ldots, input_N$, including for example voice/data traffic to be transmitted to MSs being served by the BTS transmitter 100 as well as control information from a switching center (not shown). The logical multifram generating unit 112 is connected to a traffic/control scheduler 114 and outputs traffic and control packets, such as PFCCH, PSCH, CPBCCH, and CPCCCH control data discussed above, in a logical multiframe format in accordance with traffic/control scheduling information received from the traffic/control scheduler 114. As described in more detail below, the traffic/control scheduler 114 maps PSCH and PFCCH bursts to frame locations of a y multiframe control signaling structure on a multiframe-by-multiframe basis so that the frame location for PSCH and PFCCH changes during a sequence of multiframes.

The baseband processing unit 130 receives the output of the packet scheduler 110 and maps the logical multiframe packets onto physical timeslots/frames, for example in a conventional manner. The RF processing unit 140 receives the output of the baseband processing unit 130 which generates an RF transmission signal, Tx, using an assigned RF channel, which is output to a transmitter antenna 200.

Figure 3A:
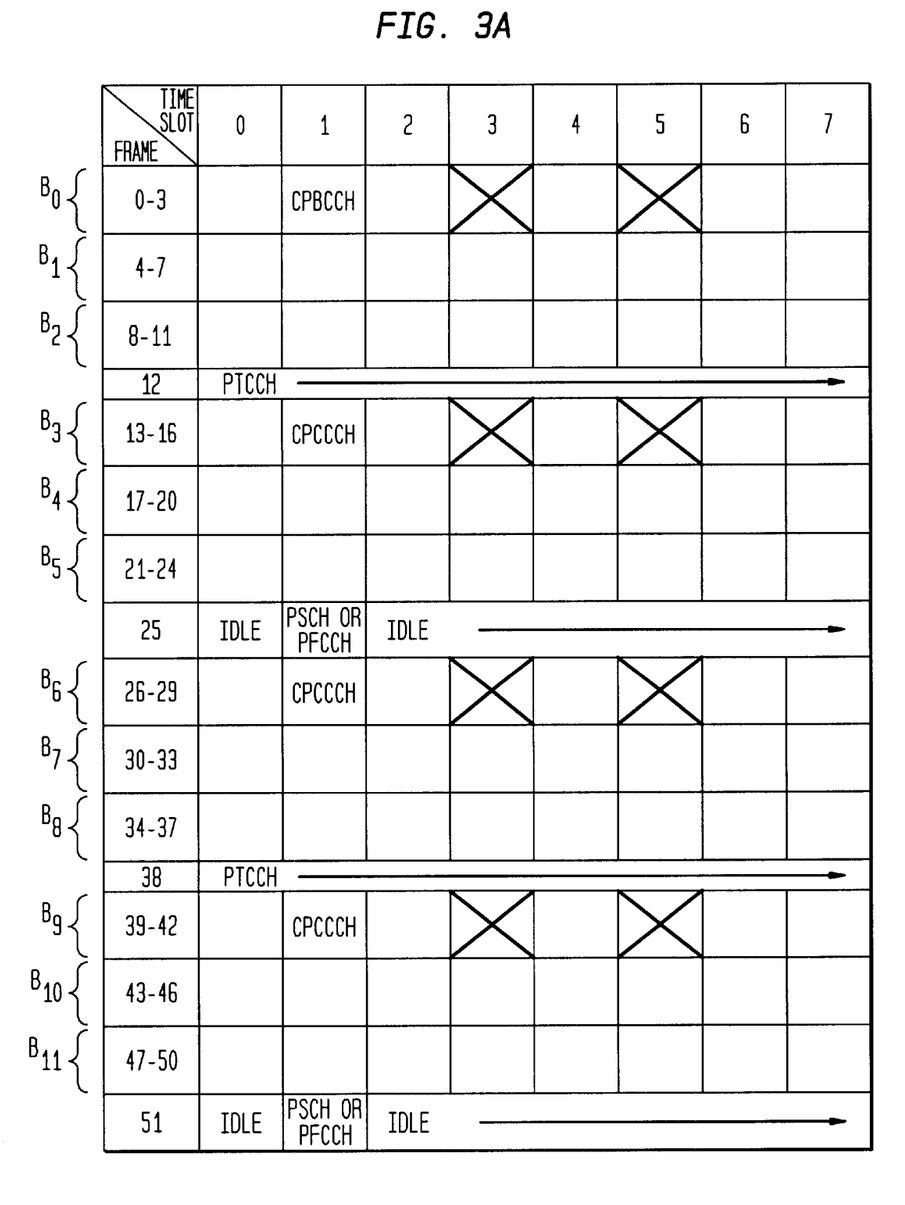
FIG. 3A illustrates an exemplary multiframe structure in which control channel bursts for sectors in a first time group are mapped in accordance with an embodiment of the present invention.

As described above, EDGE-COMPACT is nominally characterized not only by three frequency channels, ⅓ frequency reuse, and time synchronization, but is also based on time-division of each air-interface frequency channel into eight time slots and a 52 multiframe (0 . . . 51) control signaling structure similar to that used in standard GSM networks. FIG. 3A is a conceptual diagram of a 52 multiframe structure, in which a matrix is formed of eight columns, respectively representing eight time slots TS0–TS7, and a number of rows which each represent either an individual frame or a block of frames in the 52 multi-frame (0 . . . 51). As shown in FIG. 3A, each frame is made up of eight consecutive time-slots.

To protect control bursts between proximate BTSs transmitting on the same frequency channel, each time group T1, T2, and T3 is assigned to one of the eight time slots TS0 . . . TS7. In the exemplary implementation illustrated in FIG. 3A, time group T1 is designated for TS1, time group T2 is designated for TS3, and time group T3 is designated for TS5. Certain frame sequences are grouped into blocks, such that frames 0–3 form block $B_0$, frames 4–7 form block $B_1$, frames 8–11 form block $B_2$, frames 13–16 form block $B_3$, frames 17–20 form block $B_4$, frames 21–24 form block $B_5$, frames 26–29 form block $B_6$, frames 30–33 form block $B_7$, frames 34–37 form block $B_8$, frames 39–42 form block $B_9$, frames 43–46 form block $B_{10}$, and frames 47–50 form block $B_{11}$.

Control burst timing for sectors in time group T1 will next be described with reference to the 52 multiframe structure illustrated in FIG. 3A. Initially, during TS0, TS2, TS4, and TS6, (i.e., the even-numbered time-slots) of any of frames 0–24 and 26–50, there are no restrictions on transmissions for sectors in time group T1, or any other time groups. All base stations are idle during TS0, TS2, TS4, and TS6 of frames 25 and 51. Therefore, the synchronized 52 multi-frame structure only affects transmissions during the even numbered time slots TS0, TS2, TS4, and TS6 in frames 25 and 51. During TS1 of frames in $B_0$ sectors in time group T1 transmit CPBCCH bursts, and sectors in the other time groups T2 and T3 are forced idle to protect the control data of sectors in time group T1 for the exemplary ⅓ frequency reuse. In return, sectors in time group T1 are forced idle during TS3 and TS5 of frames in block $B_0$ to protect control bursts in time-groups T2 and T3, respectively. Although not shown in FIG. 3A, for four time-group networks, sectors in time group T1 are also forced idle during TS7 of frames in block $B_0$ to protect control bursts in an additional time-group T4. No control restrictions are placed on sectors during blocks $B_1$, $B_2$, $B_4$, $B_5$, $B_7$, $B_8$, $B_{10}$, and $B_{11}$, so that these blocks may be used for transmitting normal data traffic. In other words, the time-grouping of sectors is not used to protect data traffic, only control bursts. For example, sectors in all time groups T1, T2, and T3 may transmit data during any of the empty frame blocks shown in FIG. 3A.

During frame 12, sectors in all three time groups T1, T2, and T3 may transmit PTCCH bursts, which are monitored by each MS for continuous time synchronization. Sectors in time group T1 transmit CPCCCH bursts during TS1 of frame in blocks $B_3$, $B_6$, and $B_9$, and sectors in other time groups are forced idle during TS1 of frames in blocks $B_3$, $B_6$, and $B_9$ to protect the CPCCCH bursts transmitted for sectors of time group T1. In return, sectors in time group T1 are forced idle during TS3 and TS5 of frames in blocks $B_3$, $B_6$, and $B_9$ to protect the CPCCCH control bursts for sectors in time groups T2 and T3, respectively. An "X" in a matrix location of FIG. 3A is intended to illustrate the concept that sectors in time group T1 are forced idle during TS3 and TS5 of frame in blocks $B_0$, $B_3$, $B_6$, and $B_9$ to protect control bursts of sectors in time groups T2 and T3.

During TS1 of frames 25 and 51, sectors in time group T1 transmit either a PSCH burst or a PFCCH burst. The traffic/control scheduler 114 determines whether a PSCH or a PFCCH burst is transmitted during TS1 of each of frame 25 and frame 51 as a function of the frequency channel assigned to the particular sector of time group T1 and the multiframe number in a cycle of consecutive multiframes. More specifically, the PSCH and PFCCH bursts for time group T1 sectors on a first frequency channel will be re-mapped relative to the PSCH and PFCCH bursts from time group T1 sectors on at least one other frequency channel. In this way, no matter which of the three frequency channels a mobile subscriber terminal monitors during frame 25 of a first multiframe, it will be able to detect PSCH bursts being transmitted on all three frequency channels within successive multiframes. An exemplary time-mapping of PSCH bursts as a function of assigned frequency channel and multiframe number is illustrated in Table 1 below.

TABLE 1

Exemplary Mapping of PSCH Bursts

| | F1 | F2 | F3 |
|---|---|---|---|
| Multiframe 0 | PSCH on frame 25 | PSCH on frame 25 | PSCH on frame 51 |
| Multiframe 1 | PSCH on frame 25 | PSCH on frame 51 | PSCH on frame 25 |
| Multiframe 2 | PSCH on frame 51 | PSCH on frame 25 | PSCH on frame 25 |
| Multiframe 3 | PSCH on frame 51 | PSCH on frame 51 | PSCH on frame 25 |
| Multiframe 4 | PSCH on frame 51 | PSCH on frame 25 | PSCH on frame 51 |
| Multiframe 5 | PSCH on frame 25 | PSCH on frame 51 | PSCH on frame 51 |
| Multiframe 6 | PSCH on frame 25 | PSCH on frame 25 | PSCH on frame 51 |
| Multiframe 7 | PSCH on frame 25 | PSCH on frame 51 | PSCH on frame 25 |
| . | | | |
| . | | | |
| . | | | |
| Multiframe 1023 | PSCH on frame 51 | PSCH on frame 51 | PSCH on frame 25 |
| Multiframe 0 | PSCH on frame 25 | PSCH on frame 25 | PSCH on frame 51 |
| . | | | |
| . | | | |
| . | | | |

In the exemplary time-mapping shown in Table 1, during a first multiframe 0, sectors on channel F1 and channel F2 will transmit PSCH bursts on frame 25 (and PFCCH bursts on frame 51), and sectors on channel F3 will transmit PFCH bursts on frame 51 (and PFCCH bursts on frame 25). During a second multiframe 1, PSCH and PFCCH bursts for sectors on channels F2 and F3 are re-mapped such that sectors on channel F2 will transmit PFCH bursts on frame 51 and sectors on channel F3 will transmit PSCH bursts on frame 25. In a third multiframe 2, the PFCH and PFCCH bursts of sectors on channels F1 and F2 flip so that sectors on channel F1 transmit PSCH bursts on frame 51, and sectors on channel F2 again transmit PSCH bursts on frame 25. As can be seen from the pattern of PSCH bursts shown in Table 1, an MS (which knows the mapping scheme described above) has up to twice the number of opportunities to decode neighbor PSCH bursts as compared to when PSCH bursts appear only in frame 51. In this way, a MS will be able to monitor the PSCH bursts on all three frequency channels F1, F2, and F3 by the end of two multiframes. Using the sequence illustrated in Table 1, an MS will have a ⅓ probability of taking a full two multiframes to see PSCH bursts of all frequencies and all time groups, and a ⅔ probability of taking only 1.5 mutliframes to see all such PSCH bursts.

In the PSCH/PFCCH burst time-mapping cycle shown in Table 1, the sectors on channel F2 flip PSCH/PFCCH bursts each multiframe. Sectors on channels F1 and F3, however, flip PSCH/PFCCH bursts only every three multiframes, and not on the same multiframe. It should be apparent that numerous other time-mapping sequences of PSCH/PFCCH bursts are possible to achieve the same goal of increasing mobile subscriber terminal opportunities for decoding PSCH bursts of all frequency channels. For example, sectors on channel F1 may be controlled to flip PSCH/PFCCH bursts every multiframe, while sectors on channels F2 and F3 flip PSCH/PFCCH bursts every three multiframes.

Figure 3B:
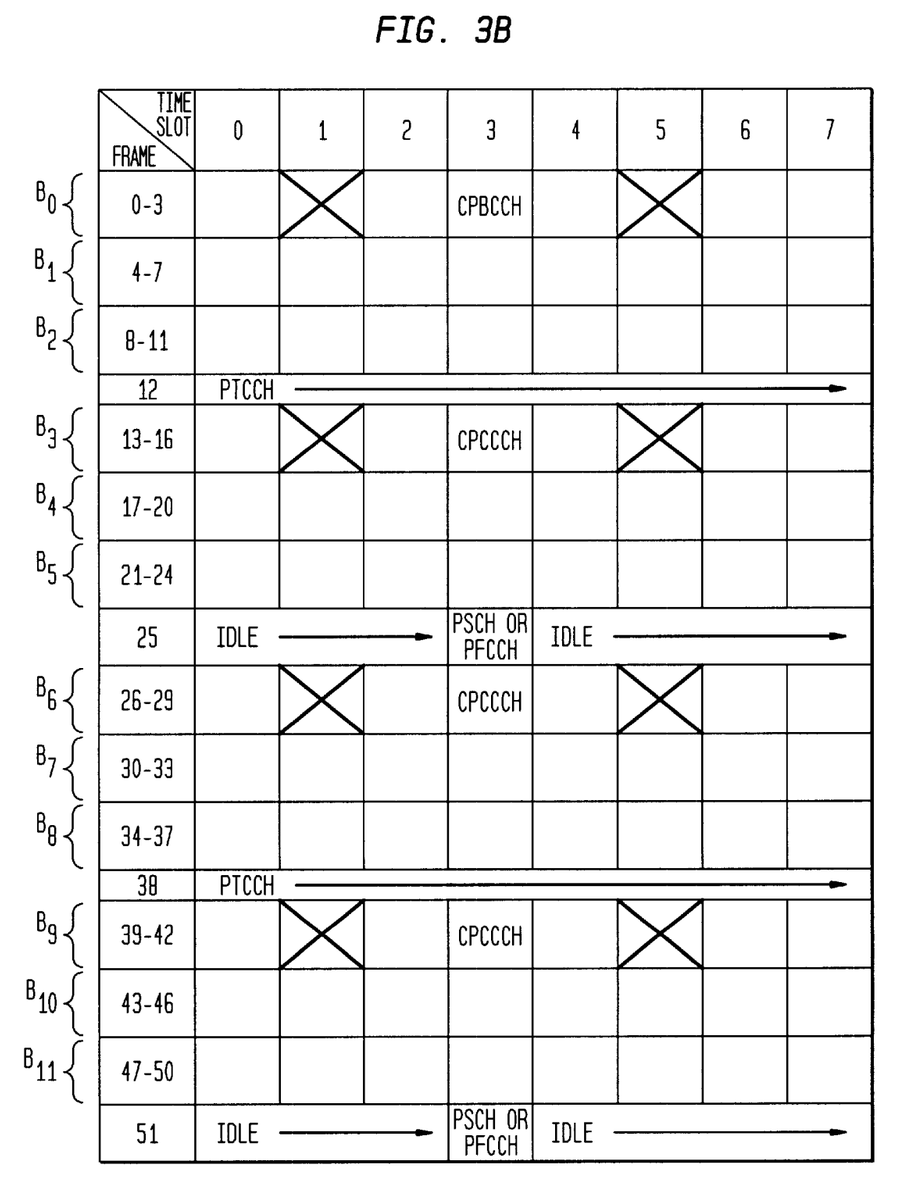
FIG. 3B illustrates an exemplary multiframe structure in which control channel bursts for sectors in a second time group are mapped in accordance with an embodiment of the present invention.

FIG. 3B illustrates the multiframe control signaling configuration from the perspective of sectors in time group T2. As shown in FIG. 3B, sectors in time group T2 transmit CPBCCH bursts during TS3 of frames in block $B_0$, transmit CPCCCH burst during TS3 of frames in blocks $B_3$, $B_6$, and $B_9$, and transmit either a PSCH or PFCCH burst during TS3 of frames 25 and 51. During such time-slots, sectors in other time groups are forced idle to protect the control bursts of sectors in time group T2. In return, sectors in time group T2 are forced idle during TS1 and TS5 of frames in blocks $B_0$, $B_3$, $B_6$, $B_9$, frame 25, and frame 51. In all other respects, the control signaling structure, including the PSCH/PFCCH burst mapping scheme illustrated in exemplary Table 1, are the same for T2 sectors as for T1 sectors described above.

Figure 3C:
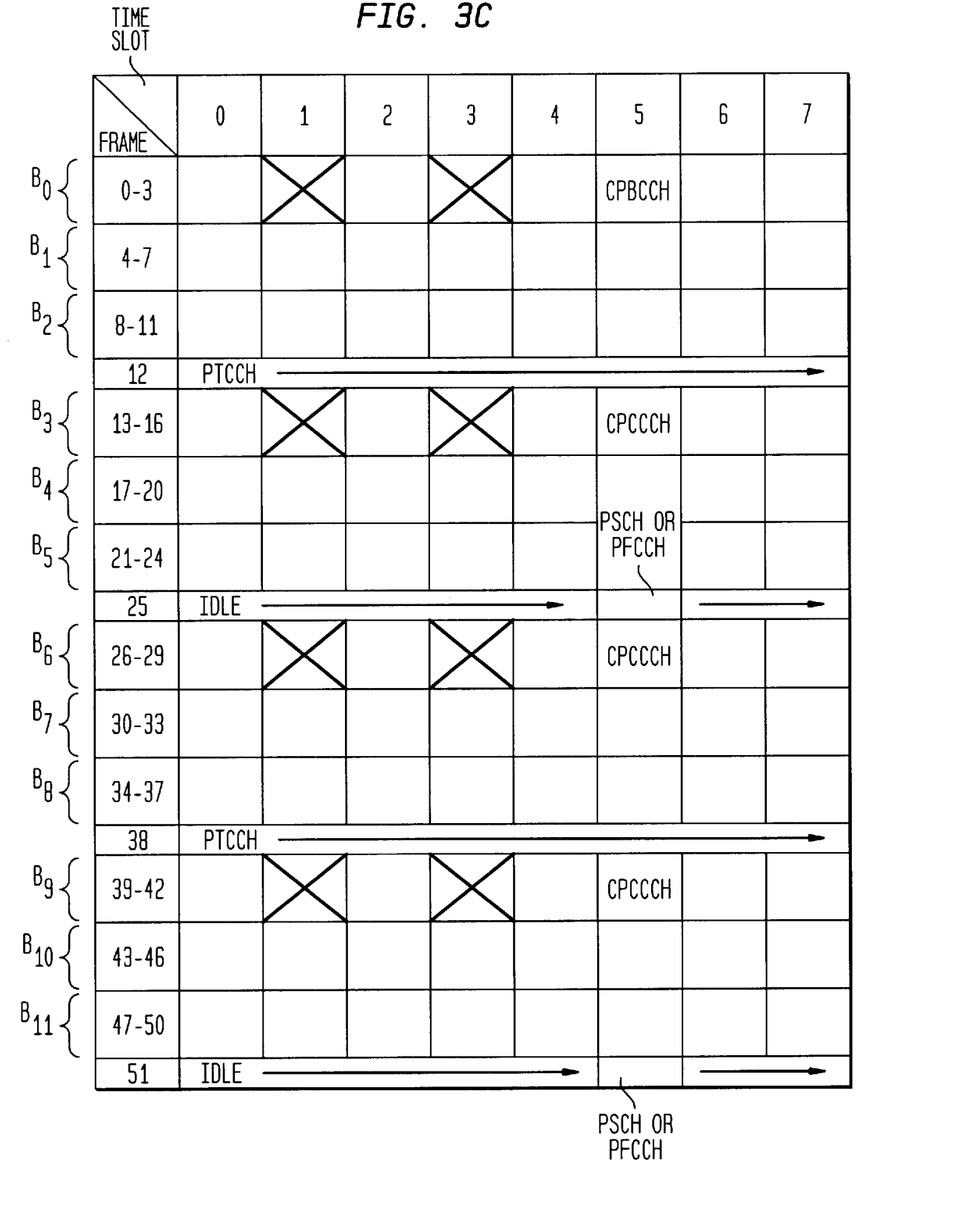
FIG. 3C illustrates an exemplary multiframe structure in which control channel bursts for sectors in a third time group are mapped in accordance with an embodiment of the present invention.

FIG. 3C illustrates the multiframe control signaling configuration from the perspective of sectors in time group T3. As shown in FIG. 3C, sectors in time group T3 transmit CPBCCH bursts during TS5 of frames in block $B_0$, transmit CPCCCH bursts during TS5 of frames in blocks $B_3$, $B_6$, and $B_9$, and transmit a PSCH or PFCCH burst during TS5 of frames 25 and 51. As discussed above, sectors in other time groups are forced idle during TS5 of frames in blocks $B_0$, $B_3$, $B_6$, $B_9$, frame 25, and frame 51 to protect the control bursts of sectors in time group T3. In return, sectors in time group T3 are forced idle during TS1 and TS3 of frames in blocks $B_0$, $B_3$, $B_6$, $B_9$, frame 25, and frame 51 to protect control bursts of other time groups. In all other respects, the control signaling configuration for sectors in time group T3, including the scheme for mapping PFCH/PFCCH bursts illustrated in the exemplary Table 1, is the same as that discussed above.

As compared to prior proposals which require sectors in all time groups and on all frequency channels to transmit PFCCH bursts in frame 25 and PSCH bursts in frame 51 of a 52 multiframe (0 . . . 51) control signaling structure, time-base mapping of PSCH/PFCCH bursts on a multiframe by multiframe basis allows each MS to decode PSCH information for all significant neighbors on three frequencies, or average over 40% more frequently.

It should be apparent to those skilled in the art that various modifications and applications of the present invention are contemplated which may be realized without departing from the spirit and scope of the present invention.

What is claimed is:

1. A method of controlling base station transmissions in a wireless network in accordance with a multi-frame timing structure which is defined as succession of y frames, each frame including a succession of x time-slots, said method comprising:
   allocating a frame/time-slot number pair to set the timing of a first-type control burst for a first multi-frame; and
   changing at least one of the (i) frame number and (ii) frame number and time-slot number of the frame/time-slot number pair for a second multi-frame so that the timing of the first-type control burst is different during the second multi-frame relative to the first multi-frame.

2. The method of claim 1, further comprising:
   allocating a frame/time-slot number pair to set the timing of a second-type control burst for the first multiframe, the frame/time-slot number pair allocated for the second-type control burst being different than that allocated for the first-type control burst for the first multiframe; and
   changing at least one of the (i) frame number and (ii) frame number and time-slot number of the frame number/time-slot number pair allocated for the second-type control burst for the second multi-frame so that the timing of the second-type control burst is different during the second multi-frame relative to the first multi-frame.

3. The method of claim 1, wherein the frame number allocated for first-type control bursts is mapped on a multiframe by multiframe basis so that the first-type control bursts are transmitted at different times of the multi-frame timing structure.

4. The method of claim 1, wherein each base station serves at least three sectors, and is assigned at least three frequency channels, one per sector.

5. The method of claim 4, wherein each sector in the wireless network service area is assigned to one of a plurality of time-groups, and the time-slot number allocated for the control burst timing is the same for each sector in a time group.

6. The method of claim 5, wherein the frame number for the first multiframe will be different than the frame number for the first multiframe for a base station which is transmitting on a different frequency channel.

7. The method of claim 5, wherein each sector is assigned to one of three time groups.

8. The method of claim 5, wherein each sector is assigned to one of four time groups.

9. The method of claim 1, wherein a single multi-frame includes 52 frames numbered 0–51.

10. The method of claim 9, wherein the frame number allocated for the first multiframe is 26, and the frame number allocated for the second multiframe is 51.

11. The method of claim 1, wherein said wireless network supports high-speed packet data service nominally using three air-interface channels and ⅓ frequency use.

12. The method of claim 1, wherein the first and second multiframes are consecutive multiframes.

13. An apparatus for controlling base station transmissions in a wireless network in accordance with a multi-frame timing structure which is defined as succession of y frames, each frame including a succession of x time-slots, said apparatus comprising:
   means for allocating a frame/time-slot number pair to set the timing of a first-type control burst for a first multi-frame; and
   means configured to allow for changing at least one of the (i) frame number and (ii) frame number and time-slot number of the frame/time-slot number pair for a second multi-frame so that the timing of the first-type control burst is different during the second multi-frame relative to the first multi-frame.

14. The apparatus of claim 13, wherein:
   said means for allocating further allocates a frame/time-slot number pair to set the timing of a second-type control burst for the first multiframe, the frame/time-slot number pair allocated for the second-type control burst being different than that allocated for the first-type control burst for the first multiframe, and said means configured to allow for changing changes at least one of the (i) frame number and (ii) frame number and time-slot number of the frame/time-slot number pair allocated for the second-type control burst for the second multi-frame so that the timing of the second-type control burst is different during the second multi-frame relative to the first multi-frame.

15. The apparatus of claim 13, wherein the frame number allocated for first-type control bursts in mapped on a multiframe by multiframe basis so that the first-type control bursts are transmitted at different times of the multi-frame timing structure.

16. The apparatus of claim 13 wherein each base station serves at least three sectors, and is assigned at least three frequency channels, one per sector.

17. The apparatus of claim 16, wherein each sector in the wireless network service area is assigned to one of a plurality of time-groups, and the time-slot number allocated for the control burst timing is the same for each sector in a time group.

18. The apparatus of claim 17, wherein the frame number for the first multiframe will be different than the frame number for the first multiframe for a base station which is transmitting on a different frequency channel.

19. The apparatus, of claim 17, wherein each sector is assigned to one of three time groups.

20. The apparatus of claim 17, wherein each sector is assigned to one of four time groups.

21. The apparatus of claim 13, wherein a single multi-frame includes 52 frames numbered 0–51.

22. The apparatus of claim 21, wherein the frame number allocated for the first multiframe is 26, and frame number allocated for the second multiframe is 51.

23. The apparatus of claim 13, wherein said wireless network supports high-speed packet data service nominally using three air-interface channels and ⅓ frequency use.

24. The apparatus of claim 13, wherein the first and second mutliframes are consecutive multiframes.

25. A method of controlling base station transmissions in a wireless network in accordance with a multi-frame timing structure which is defined as succession of y frames, each frame including a succession of x time-slots, said method comprising:

allocating a frame/time-slot number pair to set the timing of a first-type control burst for a first multi-frame; and changing the frame number and time-slot number of the frame/time-slot number pair for a second multi-frame so that the timing of the first-type control burst is different during the second multi-frame relative to the first multi-frame.

26. A method of controlling base station transmissions in a wireless network in accordance with a multi-frame timing structure which is defined as succession of y frames, each frame including a succession of x time-slots, said method comprising:

allocating a frame/time-slot number pair to set the timing of a first-type control burst for a first multi-frame; and changing the frame number of the frame/time-slot number pair for a second multi-frame so that the timing of the first-type control burst is different during the second multi-frame relative to the first multi-frame.

27. A method of controlling base station transmissions in a wireless network in accordance with a multi-frame timing structure which is defined as succession of y frames, each frame including a succession of x time-slots, said method comprising:

allocating a frame/time-slot number pair to set the timing of a first-type control burst for a first multi-frame; and configuring the multi-frame time structure to allow for changing the frame number and time-slot number of the frame/time-slot number pair for a second multi-frame so that the timing of the first-type control burst is different during the second multi-frame relative to the first multi-frame.

28. An apparatus for controlling base station transmissions in a wireless network in accordance with a multi-frame timing structure which is defined as succession of y frames, each frame including a succession of x time-slots, said apparatus comprising:

means for allocating a frame/time-slot number pair to set the timing of a first-type control burst for a first multi-frame;

means for changing at least one of the frame number and time-slot number of the frame/time-slot number pair for a second multi-frame so that the timing of the first-type control burst is different during the second multi-frame relative to the first multi-frame; and means for configuring the means for changing to allow for changing (i) the frame number, (ii) the time-slot number and (iii) the frame number and time slot number.

\* \* \* \* \*